US005339014A

United States Patent [19]

Nesper

[11] Patent Number: 5,339,014

[45] Date of Patent: Aug. 16, 1994

[54] APPARATUS FOR SAFETY MONITORING IN PROTECTIVE ARRANGEMENTS WITH NORMAL AND ENHANCED SAFETY OF MACHINERY PERFORMING MULTIPLE-AXIS ROTATIONS

[75] Inventor: Gerhard Nesper, Oberstenfeld, Fed. Rep. of Germany

[73] Assignee: Elge Elektronik-Gerätewerk GmbH & Co., Schopfloch, Fed. Rep. of Germany

[21] Appl. No.: 730,201

[22] Filed: Jul. 15, 1991

[30] Foreign Application Priority Data

Jul. 12, 1990 [EP] European Pat. Off. ........ 90113345.4

[51] Int. Cl.[5] ...................... H02H 7/08; G05B 19/405; B25J 19/06; F16P 3/00

[52] U.S. Cl. .................................... 318/563; 318/800; 318/778; 361/23; 361/29

[58] Field of Search ............... 318/800, 782, 783, 434, 318/473, 778; 361/23, 24, 29, 33, 92; 340/507; 324/510, 511; 364/474.19, 184, 185, 551.02

[56] References Cited

U.S. PATENT DOCUMENTS

| | | | |
|---|---|---|---|
| 3,913,413 | 10/1975 | Walker . | |
| 4,105,903 | 8/1978 | Shaw et al. . | |
| 4,171,735 | 10/1977 | Zuhlke et al. . | |
| 4,282,963 | 8/1981 | Kafura et al. . | |
| 4,434,390 | 2/1984 | Elms | 318/798 X |
| 4,453,117 | 6/1984 | Elms et al. | 318/778 |
| 4,456,867 | 6/1984 | Mallick, Jr. et al. | 318/778 |
| 4,467,260 | 8/1984 | Mallick, Jr. et al. | 318/800 |
| 4,476,423 | 10/1984 | Mallick, Jr. et al. | 318/800 |
| 4,717,984 | 1/1988 | Henry et al. | 361/25 |

FOREIGN PATENT DOCUMENTS

| | | |
|---|---|---|
| 9102270 | 7/1991 | Fed. Rep. of Germany . |
| 3900733 | 8/1991 | Fed. Rep. of Germany . |
| 3837218 | 10/1991 | Fed. Rep. of Germany . |
| 4106009 | 8/1992 | Fed. Rep. of Germany . |

OTHER PUBLICATIONS

German article "KEM" Thema des Monats: Schalter und Relais, Sicherheitsrelais–Bausteine bieten verdrahtungssparende Kompaktlösungen, Erst bei Störung schalten, Jan. 1989, pp. 55–56.

*Primary Examiner*—Paul Ip
*Attorney, Agent, or Firm*—Darby & Darby

[57] ABSTRACT

In an apparatus for safety monitoring of protective arrangements with normal or enhanced safeguard for machinery performing multiple-axis rotations with shutoff contactors in the power supply section of the machine and an external monitoring circuit for safety hoods, contact, and manual permission for limited rotation, it is proposed that a power supply unit and a control unit, each in separate subhousings, be arranged in a basic device, with a plug contact connection being provided between the two that is separable and serves for interposed series connection of further supplementary monitoring units, with each monitoring unit monitoring certain shaft circuits of the target system and delivering its output signals in parallel on continuous tie lines guided via the respective plug contact means to the power supply unit, which activates shutoff contactors located in the power section of the target system via output relays.

9 Claims, 16 Drawing Sheets

APPARATUS FOR SAFETY MONITORING IN PROTECTIVE ARRANGEMENTS WITH NORMAL AND ENHANCED SAFETY OF MACHINERY PERFORMING MULTIPLE-AXIS ROTATIONS

FIELD OF THE INVENTION

The invention is based on an apparatus for safety monitoring in protective arrangements.

BACKGROUND OF THE INVENTION

A known creep and rotation monitoring system in protective arrangements with normal or enhanced safety of this type (DE-OS 38 37 218), defines three different functional modes in the safety monitoring system, so as thereby to correspond to the various safety aspects of a target system. These three functional modes are defined so that:

A stationary monitoring system is implemented as a special mode with no motion, with the operating state of the target system corresponding to an open hazard zone (safety hood or safety screen open);

Further, a stationary monitoring system can be realized as a special mode with motion, again with an open hazard zone and with manual request for permission for limited creep of the target system; and lastly A rotation monitoring system is implemented as the normal mode with the hazard zone closed, with limited rotation of the target system permitted within predefined limits.

In this context, monitoring of the operating states and rotary motions is subject to an absolute functional safety system corresponding in each case to double monitoring in a device, with the result that if faults occur, drive energy is always cut off.

It is possible in this context to sense the rotation of a shaft by means of two different encoder systems, with both of the signals obtained by means of corresponding rotation sensors being delivered to corresponding inputs of the monitoring circuit in the form of square-wave pulses, so that the rotation signals can be processed by two measurement systems operating independently of each other, and can be redundantly analyzed in terms of their limited values.

It is also possible, by suitably timing the measurement systems by means of the prepared rotation signal, to realize reliable monitoring of the operability of the measurement systems and the encoders themselves. If one of the encoders fails and if a measurement system is faulty, the device responds to the malfunction status that it has detected by immediately shutting off drive energy.

Further safety aspects of the known arrangements consist in the fact that in the event of a malfunction, drive energy is shut off by means of two safety output relays that operate independently, with the additional possibility of determining the operability of the safety output relays without shutting off drive energy, in connection with various test modes that are implemented by the measurement or monitoring systems. For example, it is possible to initiate deactivation of the driver stage for the safety output relays, whose consequently dead status is reported to a downstream control electronic system. If the same signals are present in both circuits, such a test mode will then be mutually automatically acknowledged; deactivation of the safety output relay systems can then occur without shutting off drive energy, since special capacitor storage circuits are provided, which are activated within the release time.

It is a generally known practice to associate protective circuits with operating machinery of various types, especially automatic machinery, and in any event to design the machinery's control system so that the operating motion of the machine is halted as immediately as possible if a situation hazardous to the operator is present. This also includes machinery that cannot even be started, i.e. put into operation, unless a safety hood is closed or the operator actuates certain controls with both hands. Unlike these known protective arrangements, complex process-controlled production machines, for example CNC (=computerized numerical control) systems and industrial robots, present particularly stringent industrial safety requirements, for example when operators are in the hazard area of the machine in a special operating mode.

For example a hardware-based safety shutoff system for machinery is known, which operates in connection with the system controller and guarantees a safe condition in certain operating modes. Disadvantages can occur here as well, however, such as unnecessary charging time for power components, positioning losses due to data errors, and the like, so that further attempts at a solution are required here.

The invention is therefore based, proceeding from the creep and rotation monitoring arrangement of the aforesaid type, on the object of configuring a safety monitoring arrangement capable of meeting all safety requirements in such a way that even complex machines, especially known semi-automatic or automatic machines, in which more than one drive group requiring monitoring is always present, can be incorporated into a simply designed total monitoring system that can be expanded depending on requirements and drive systems.

SUMMARY OF THE INVENTION

The invention achieves this object by means of the characterizing features of the main claim, and has the advantage that the entire creep and rotation monitoring system for machinery performing multiple-axis rotations can be monitored with one basic device and a suitable number of expansion units, with no need to consider the specifications of individual machine manufacturers. The monitoring arrangement according to the invention is therefore universally applicable and especially economical because, using the assumption of one basic device in a given machine, even a very complex one, initially a first and a second shaft circuit can be monitored for creep and rotation, each on two channels, with each monitoring system operating completely independently, i.e. two monitoring measurement systems are provided for each shaft circuit, so that one basic device in a first "control unit" has a total of four such monitoring measurement systems, which are then each supplemented, by means of additional supplementary monitoring units, with two additional shaft circuits, each with two-channel monitoring, thus with a total of four monitoring measurement systems.

In this connection the basic device is configured so that it is divided into a power supply unit with its own housing and the aforementioned control unit, which also comprises its own subhousing and is connected to the power supply unit by means of a plug connection of basically any type. If this plug connection is separated, it is then possible to insert additional supplementary monitoring units between the power supply unit (only one of which is present in each case) and the control unit (only one of which is present in each case) which then also simultaneously always necessarily constitutes the last terminal unit, with the electrical connection in each case being made by appropriate plug contacts which are configured so that no error due to incorrect connections is possible. It is evident that the partial circuit area of the basic device referred to earlier as the "power supply unit" does not simply supply power, but performs fundamental tasks of the safety monitoring system that need to be performed only once, i.e., the sum of the creep and rotation analyses is determined by the power supply unit and reported, by means of an associated safety output relay system, to a downstream externally connected control system; moreover the global signals of monitoring circuits for determining individual operating states which each occur only once for a given machine are suitably processed, and pass from the said power supply unit to the downstream individual creep and rotation monitoring units, so that reciprocal communication in both directions occurs at the plug contacts, starting at the power supply unit, through the various interposed monitoring units, to the particular control unit constituting the terminal circuit. In this connection the individual creep and rotation monitoring units are connected mechanically (via the plug contacts) and electrically one after the other "in series", but operate in parallel on connecting lines that lead to the power supply unit, so that each monitoring measurement system of each monitoring unit is capable of activating the power supply unit and bringing the entire machine to a halt.

This results in the advantage for the user that only one basic device (power supply unit, control unit) ever needs to be provided for each machine or machine system being monitored, and then, depending on the complexity of the machine, an appropriate number of monitoring units must be added, or more precisely must be connected to one another in series by interposition during assembly, resulting in a safety system which meets all requirements of the protective arrangement with double (i.e. redundant) monitoring of all shaft circuits. Thus each additional unit, namely the control unit as well as the supplementary monitoring units which can be individually plugged in and thus connected in series with one another, independently monitors two shaft circuits at a time, and thus because of the required redundancy has available in each case a total of four monitoring measurement systems. Each of the units can be defined by means of its own independent parameters, and provides creep and rotation analysis.

What is thus provided for each shaft circuit is a first relevant signal, which changes in proportion to the rotation and is detected by means of a separate motion sensor or encoder; as well as a second relevant and thus redundant signal, which either can also be detected by means of a separate encoder which then operates in another frequency range; or (advantageously) an additional signal, which confirms the first relevant rotation signal and thereby ensures the redundant function of the shaft circuit, is determined, specifically by deriving from the particular power section of the shaft circuit an activation signal which indicates, as a high signal or low signal ("1" or "0", respectively), whether the shaft drive motor is being energized. This possibility is available as an alternative to the possibility, also envisaged, of separately providing a second encoder per shaft for rotation detection.

An additional advantage of the invention consists in the fact that each of the individual monitoring units has three different functional modes which can be selected, as indicated in the aforesaid DE-OS 38 37 218, by means of the corresponding external operating state of the target system (e.g., automatic lathe with a number of shaft circuits) externally, namely by outside intervention of the particular operator.

Lastly, it is advantageous that the aforesaid individual units in their respective subhousings are mechanically configured in a uniform housing embodiment by wireless plug-in module assembly, with the plug system being designed so that incorrect series connection of the units is ruled out; and in addition each consequently middle supplementary monitoring unit must, when no additional supplementary monitoring units are to be added to it, be terminated on its respective unoccupied side, by the control unit belonging to the basic device in order to guarantee the operability of this monitoring system.

The respective housing dimensions are such as to allow insertion into a standardized mounting rail.

Advantageous further embodiments and enhancements of the invention are possible based on the features set forth in the subclaims.

BRIEF DESCRIPTION OF THE DRAWINGS

Practical examples of the invention are depicted in the drawings and will be explained in more detail in the specification below.

DESCRIPTION OF THE PREFERRED EMBODIMENTS

Figure 1A:
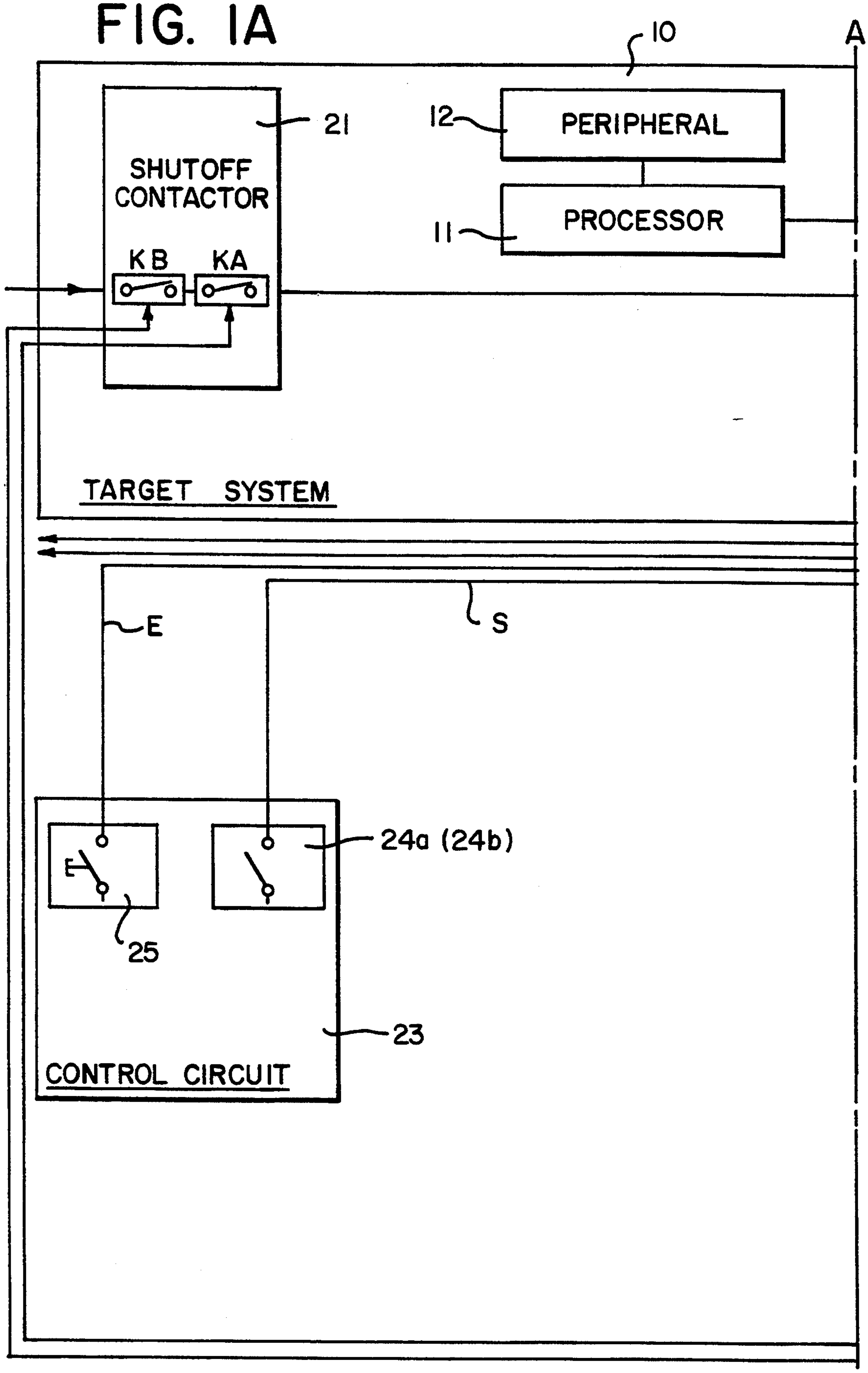
FIGS. 1A and 1B show a block diagram of the basic device of the present invention, and a schematic depiction of the target system.
Figure 1B:
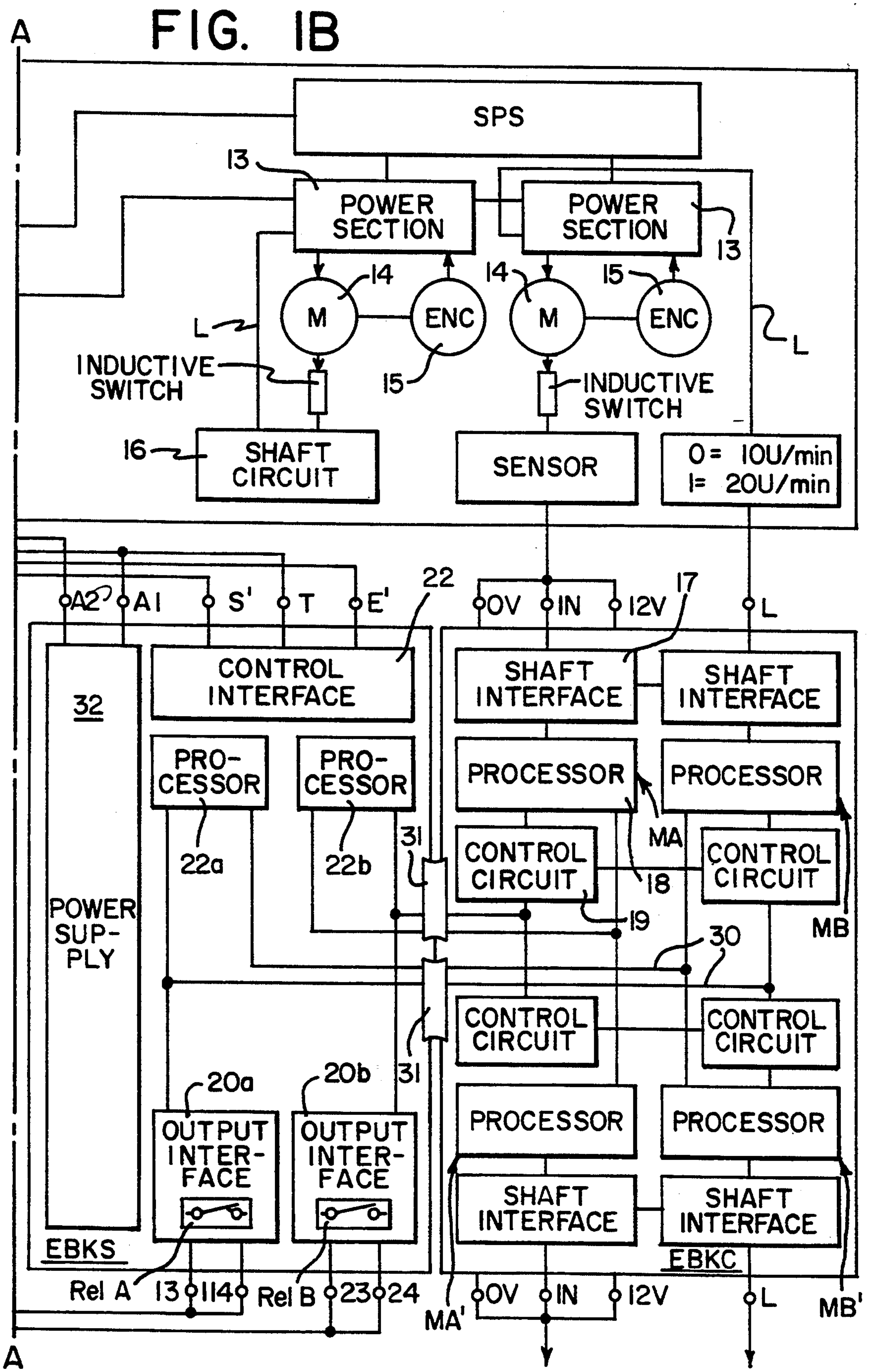
Figure 2A:
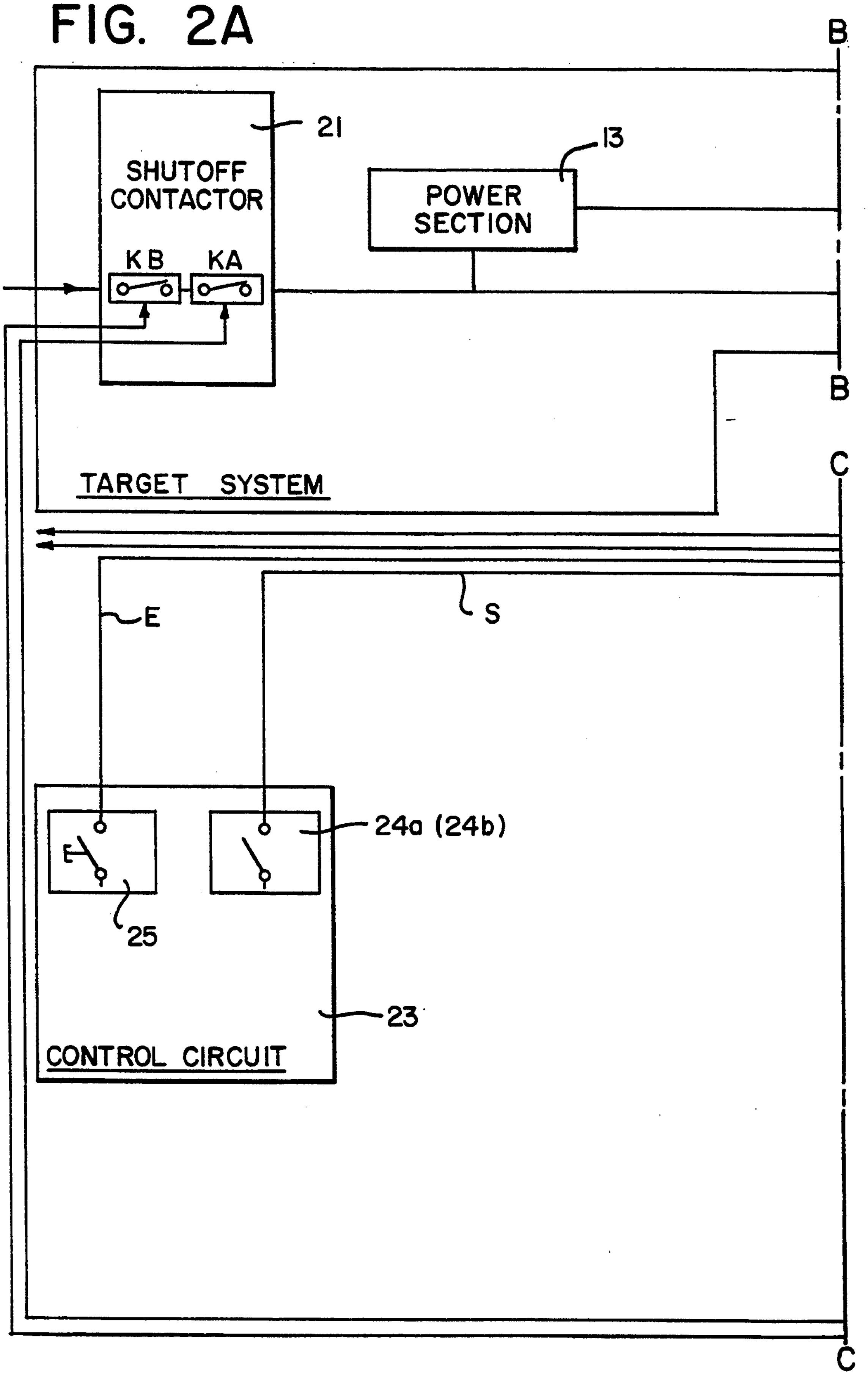
FIGS. 2A, 2B and 2C show a block diagram of a basic device of the present invention supplemented with only one additional monitoring unit.
Figure 2B:
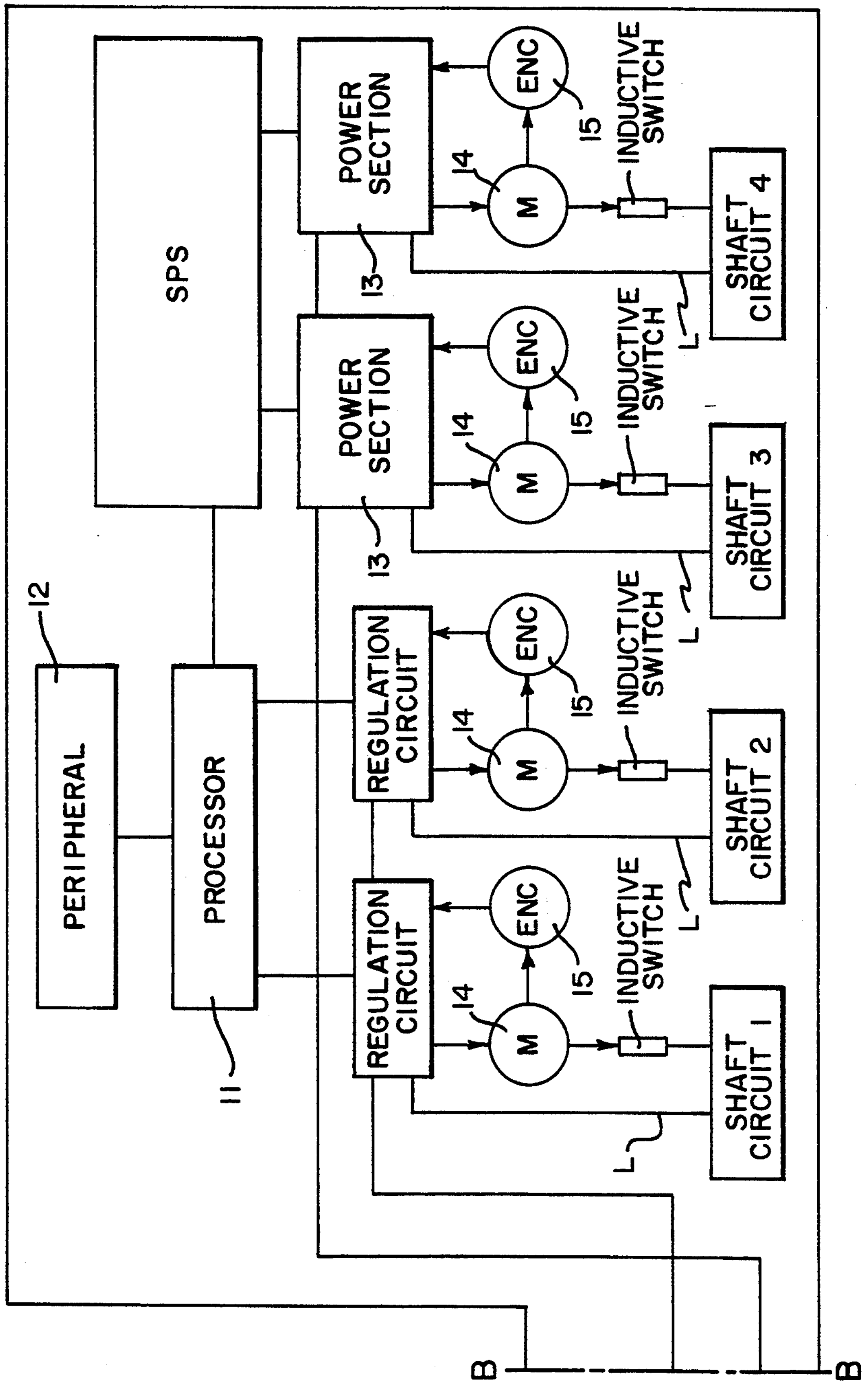
Figure 2C:
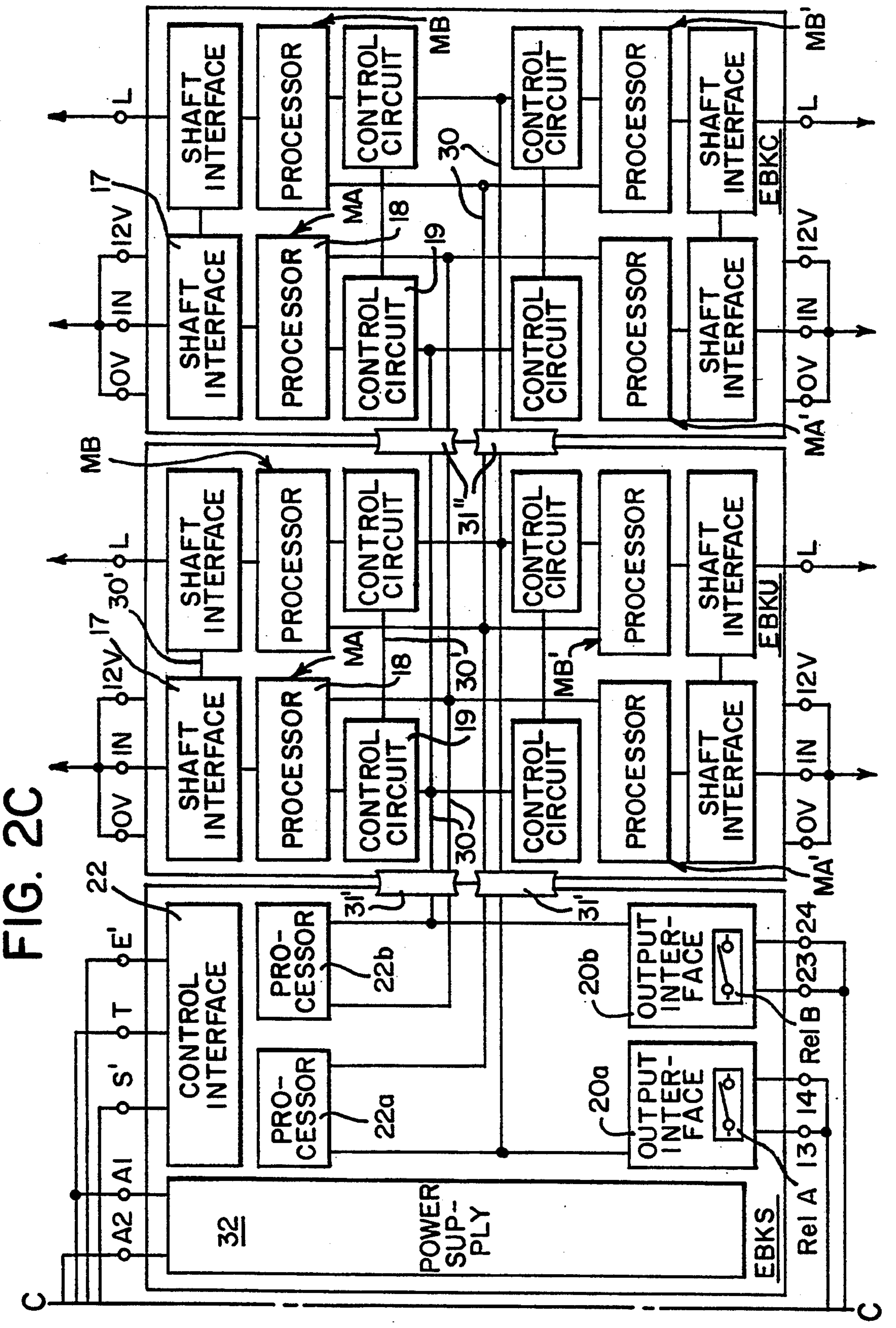

Referring to the block diagrams in FIGS. 1 and 2, the machine being monitored (target system) is designated 10 and 10'; it is not part of the monitoring circuit area and consists, without going into greater detail, of a suitable processor or control element 11, a peripheral 12 associated with control element 11 and power sections 13 energized by the processor which, by reply or otherwise, make possible regulated operation of the particular motion unit 14 energized by the power section, for example an electric motor.

In the practical example of the invention that is illustrated, the electric motors whose particular output rotations are to be monitored, which can, for example, be the drive motors for the spindles of a lathe, a milling machine or the like, are in each case denoted 14.

The target system can basically be of any type and configuration; there is provided therein for each shaft circuit a power section 13, power for which is supplied via a shutoff contactor section 21, which is acted upon by the output circuit of the power supply unit belonging to the basic device. Shutoff contactor section 21 comprises two series-wired shutoff contactors KB and KA, each of which is acted upon by its own output interface circuit 20*a*, 20*b* of the power supply unit EBKS.

To monitor the motion or rotation of each shaft circuit, two dissimilar or different motion sensors (which are also called encoders) are provided; according to a preferred practical example of the present invention, however, there is associated with each shaft circuit, i.e. with each spindle for example, only one external rotation sensor 15 which in FIGS. 1 and 2 is denoted as the IN signal proportional to the rotation, while the confirmation signal ensuring redundant operation of the shaft circuits is derived, as signal L, from the particular power section 13 for the corresponding shaft circuit, and thus also reaches the respective shaft circuit functional block 16.

The depiction in FIGS. 1 and 2 indicates that each control and monitoring unit can process two independent shaft circuit signal data, so that as shown in FIG. 1, a monitoring system consisting of one basic device can perform two separate shaft circuit monitoring operations, as indicated.

The encoders used can sense the rotation of the particular output shaft in any manner at all; thus for example they can be optical, inductive or capacitive proximity switches or sensors, while Hall generators, incremental rotation sensors, magnetic field plate proximity switches, and the like can also be used. ordinarily the arrangement can be a coding plate or slotted plate that is optically sensed, while the redundant signal L from the respective power section can be a high signal ("i") for a rotation, and a "O" signal when stationary.

Remaining initially with FIG. 1, the two relevant output signals for each moving shaft pass, via their respective device inputs IN and L, to the associated monitoring measurement system MA, MB for the first shaft circuit and MA', MB' for the second shaft circuit.

Each of the measurement systems analyzes the incoming rotation signals IN and L in terms of their limited predefined values and comprises, for each relevant rotation signal—as will be explained below only once with reference to control unit EBKC in FIG. 1—a shaft interface 17, a downstream processor unit 18, and a control circuit 19 connected thereto, whose respective output signals (four control circuits are thus located in each control unit EBKC and supplementary monitoring unit EBKU) pass via tie lines 30 and the aforesaid plug contact connections 31 to output interface circuits 20*a*, 20*b*, which act upon the shutoff contactors.

The universally shared power supply unit EBKS has, in addition to output interface circuits 20*a*, 20*b*, not only a line power section 32 for generally supplying power to the connected units via their respective plug contacts, but also a common monitoring interface 22, which acts, via interposed processor circuits 22*a*, 22*b*, the aforesaid tie lines, and plug contacts 31, on the control units (this time in the opposite direction), so that the latter also react to the signals of an external monitoring circuit 23 also associated with the target system, and can operate in a suitably matched functional manner, especially when switching among the various functional modes (which remain to be discussed).

External monitoring circuit 23 comprises one or preferably two separate door contact circuits 24*a*, 24*b* and a permission contact circuit 25 which is a default-open switch that re-opens when it is no longer being manually actuated by an operator, and can therefore preferably be configured as a pushbutton.

In protective arrangements with normal safety, monitoring circuit 23 contains only a door contact circuit (as illustrated in FIG. 1) in the form of a default-open switch, output signal S of which is delivered to input S' of monitoring interface 22.

Signal E of the permission contact circuit (default-open switch 25) arrives at input E' of the monitoring interface.

Figure 8A:
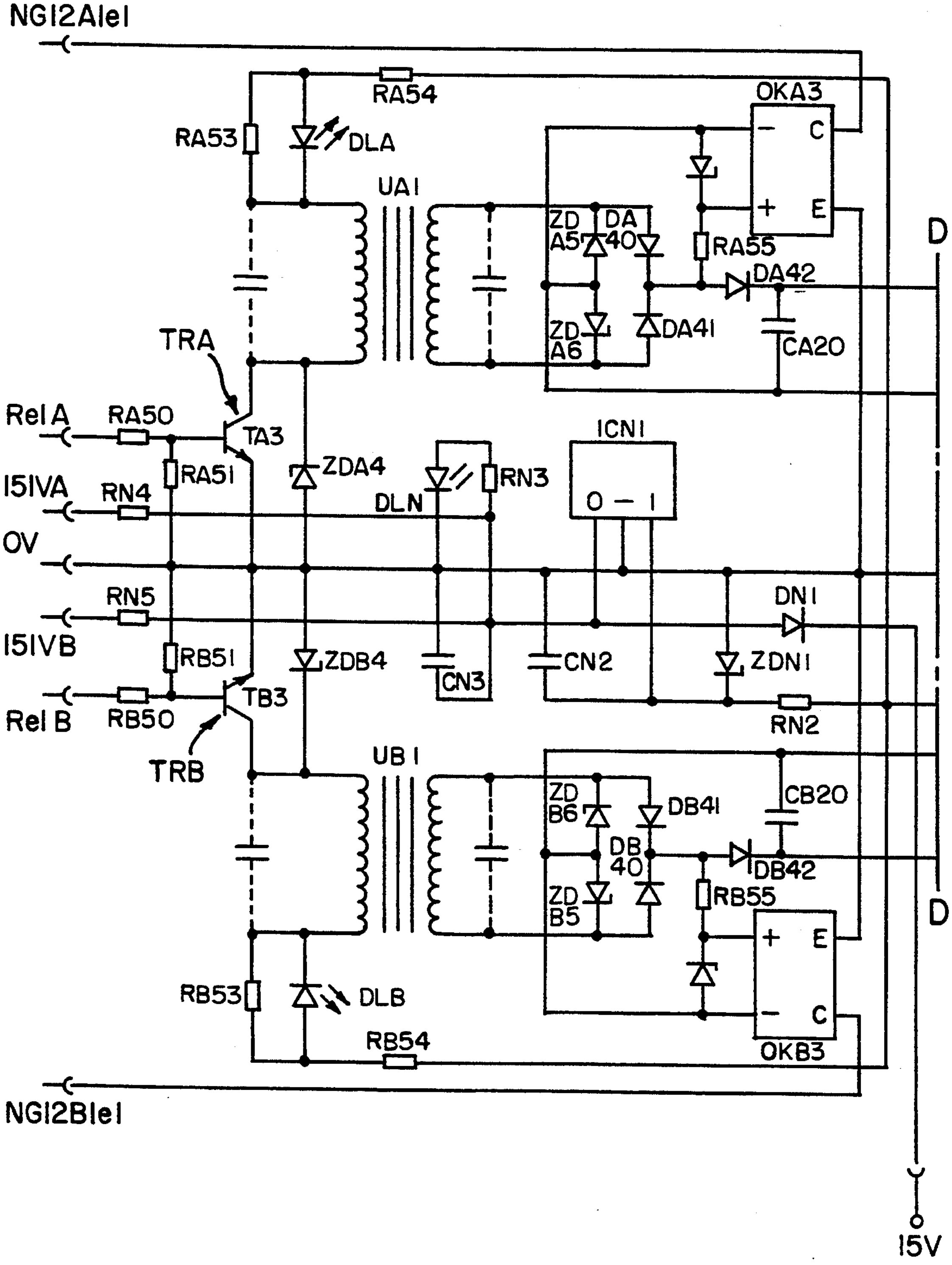
FIGS. 8A and 8B indicate an embodiment of an output circuit area of the power supply unit.
Figure 8B:
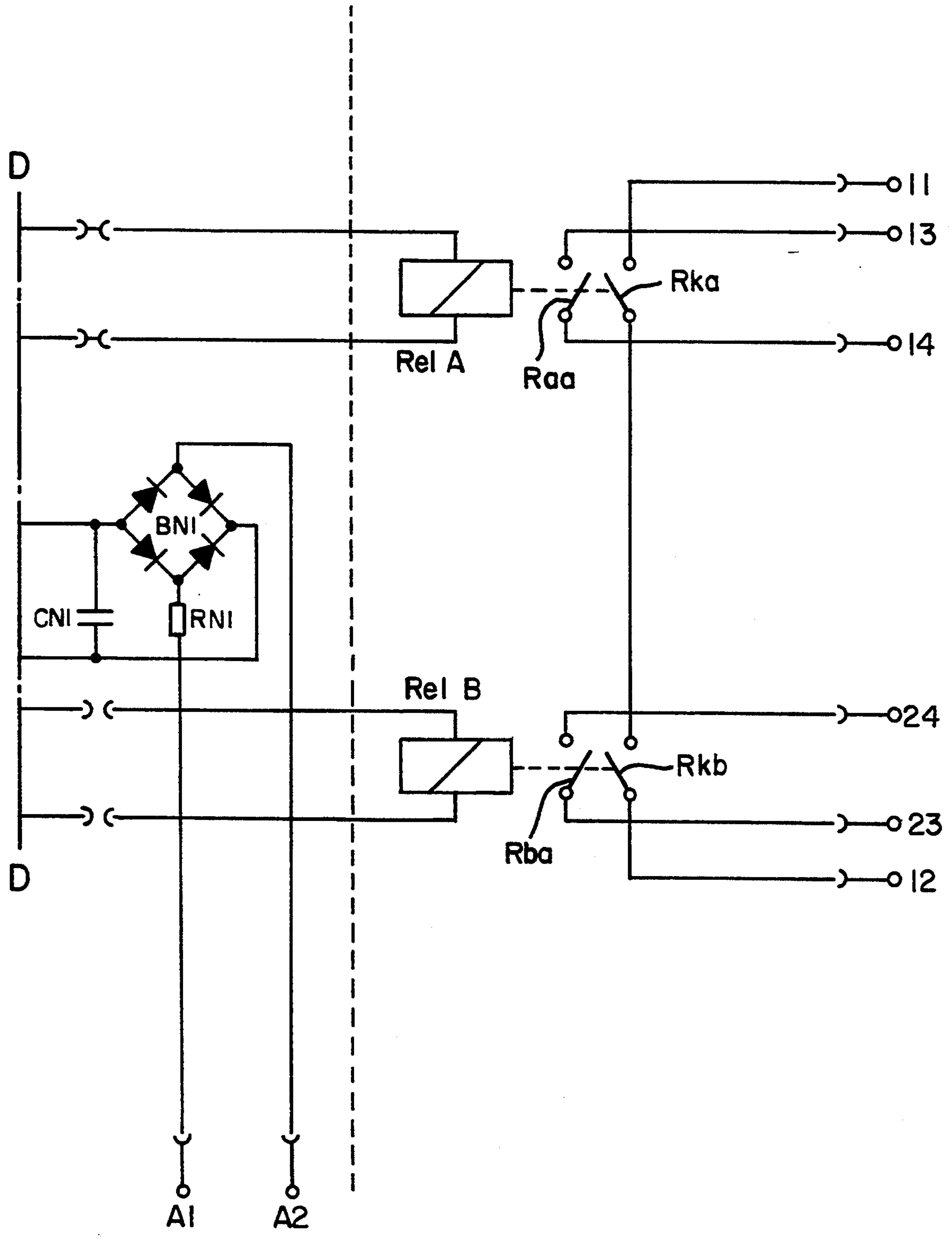

With regard to control of the output circuit by power supply unit EBKS, it should also be mentioned that associated with output interface circuits 20*a*, 20*b* are output switching relays Rel A and Rel B, which energize the circuit in which each of the shutoff contactors is connected in series to power sections 13 of the target system (see also FIG. 8). The output switching relays each have a break contact Rka, Rkb as well as a corresponding number of operating contacts Raa and Rab. These as well as other break contacts of the energized shutoff contactors KA and KB can be used to control activation and operation, and are connected only to the respective operating contacts, while the erating contact circuits serve to shut off drive energy and are connected only to the break contact.

As compared with the block diagram of FIG. 1, the block diagram of FIG. 2 shows an expanded monitoring system with a total of four separate shaft circuit monitors for a given target system, with the sole difference that while power supply unit EBKS and terminal control unit EBKC unit belonging to the basic device are retained, in the practical example of FIG. 2 there is interposed between these two, by separating their respective plug contacts 31, only a single additional supplementary monitoring unit EBKU; it is evident that in this case basically any number of additional supplementary monitoring units EBKU can be added on in series by simple interposition, of course always in such a way that an EBKC control unit constitutes the terminating unit.

For this purpose, supplementary monitoring units EBKU have on both sides plug contact regions 31' and 31'' which, for reliable orientation and to eliminate misconnections, can for example be configured so that in each case plugs are provided on one side and sockets on the other, so that series connection can occur only in one defined manner.

It is worth noting that this series connection of the various add-on monitoring units (supplementary monitoring units and control unit) for rotation by means of the plug contacts in each case extends tie lines 30 that are guided through each device, so that ultimately, for example, the outputs of the respective control circuits 19 of each additional unit (and each unit contains four control circuits, as shown) are connected in parallel to the respective associated tie line 30. Internal tie lines 30' can then also be provided, for example between the particular shaft interfaces or the control circuits, so that the latter can interchange data, or, since they belong in each case to a single shaft circuit, so that reciprocal acknowledgment is possible in certain test modes.

Figure 3:
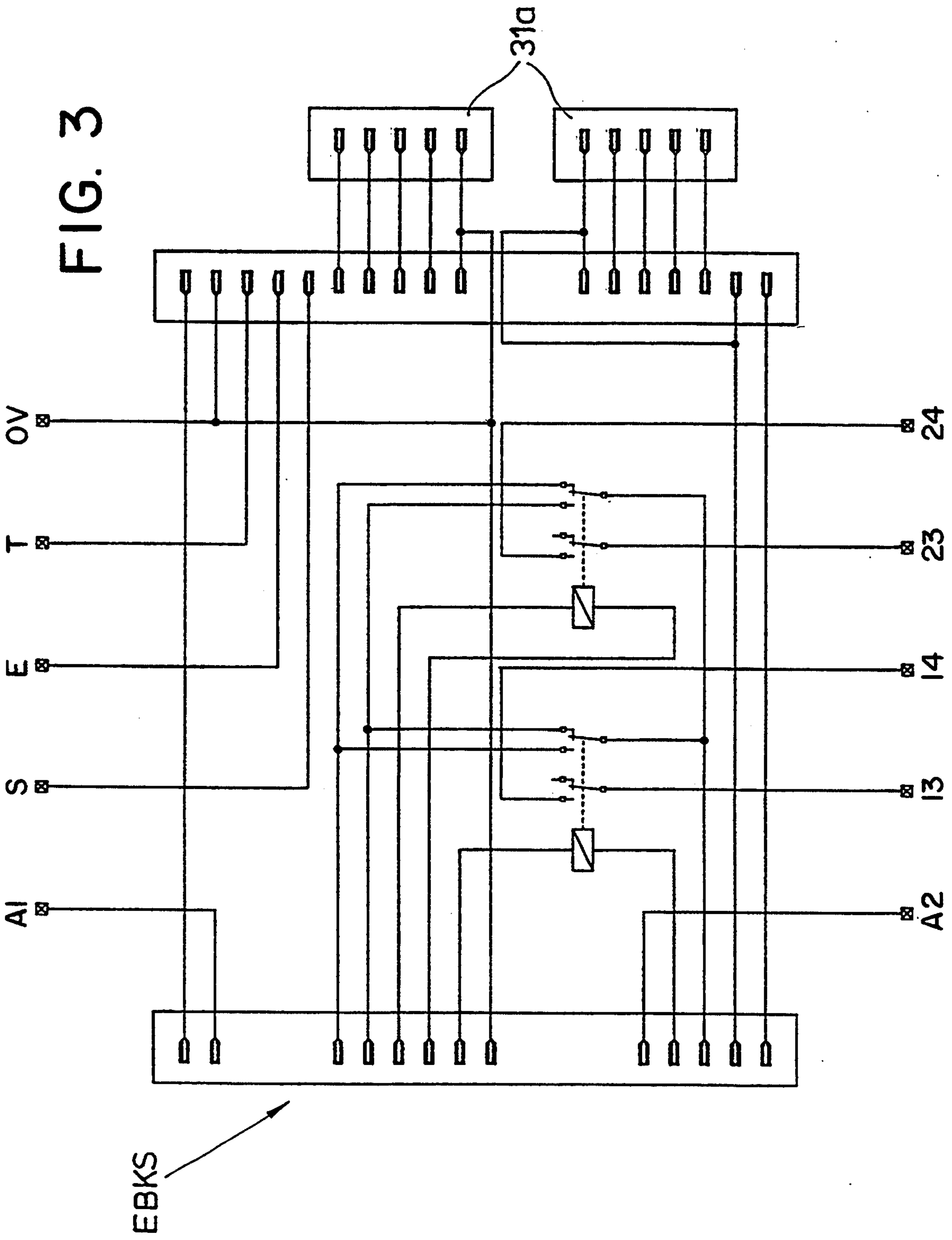
FIG. 3 schematically depicts a wiring example for the power supply unit of the present invention.
Figure 4:
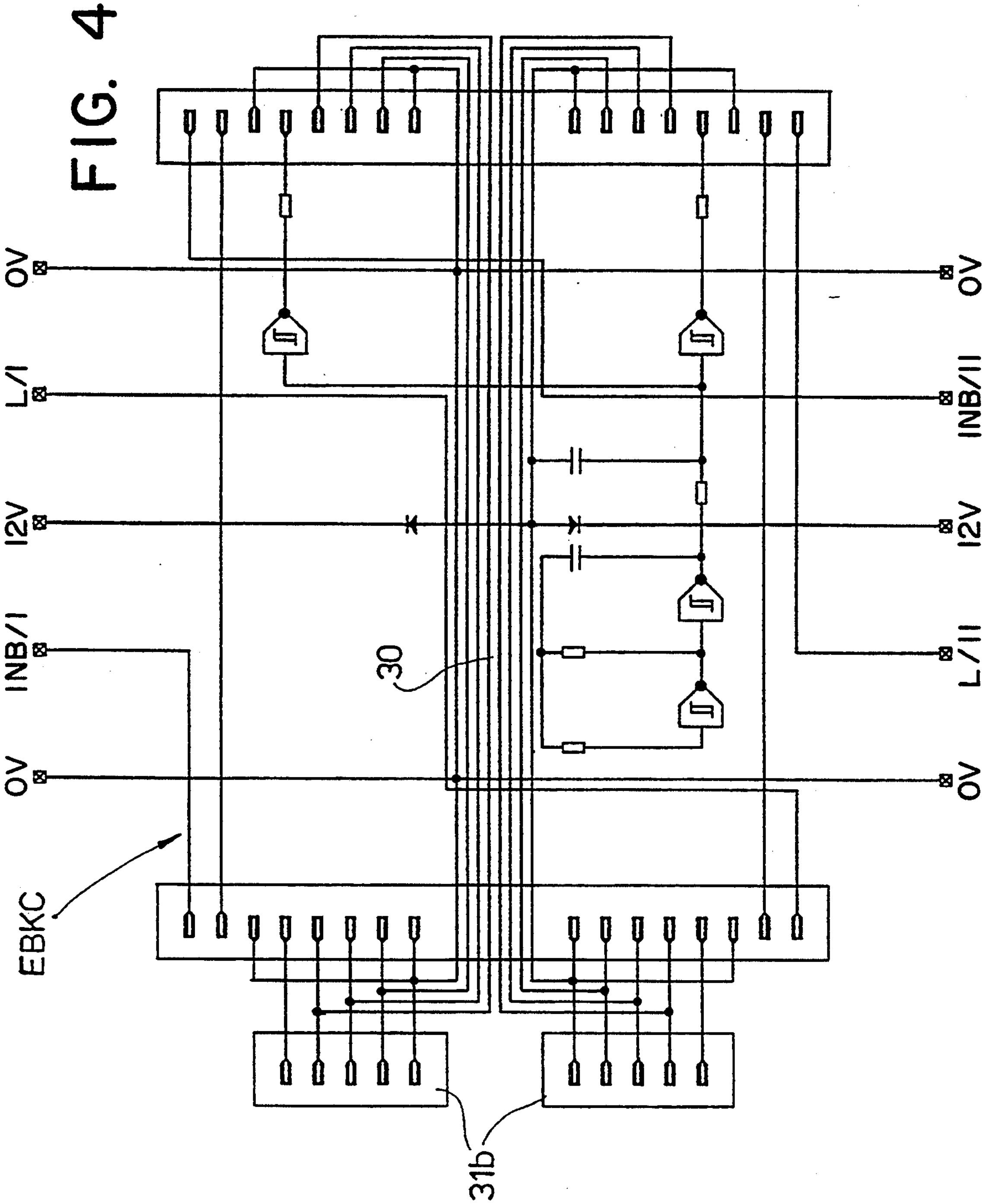
FIG. 4 shows the wiring example of the control unit, with connections for additional units.
Figure 5:
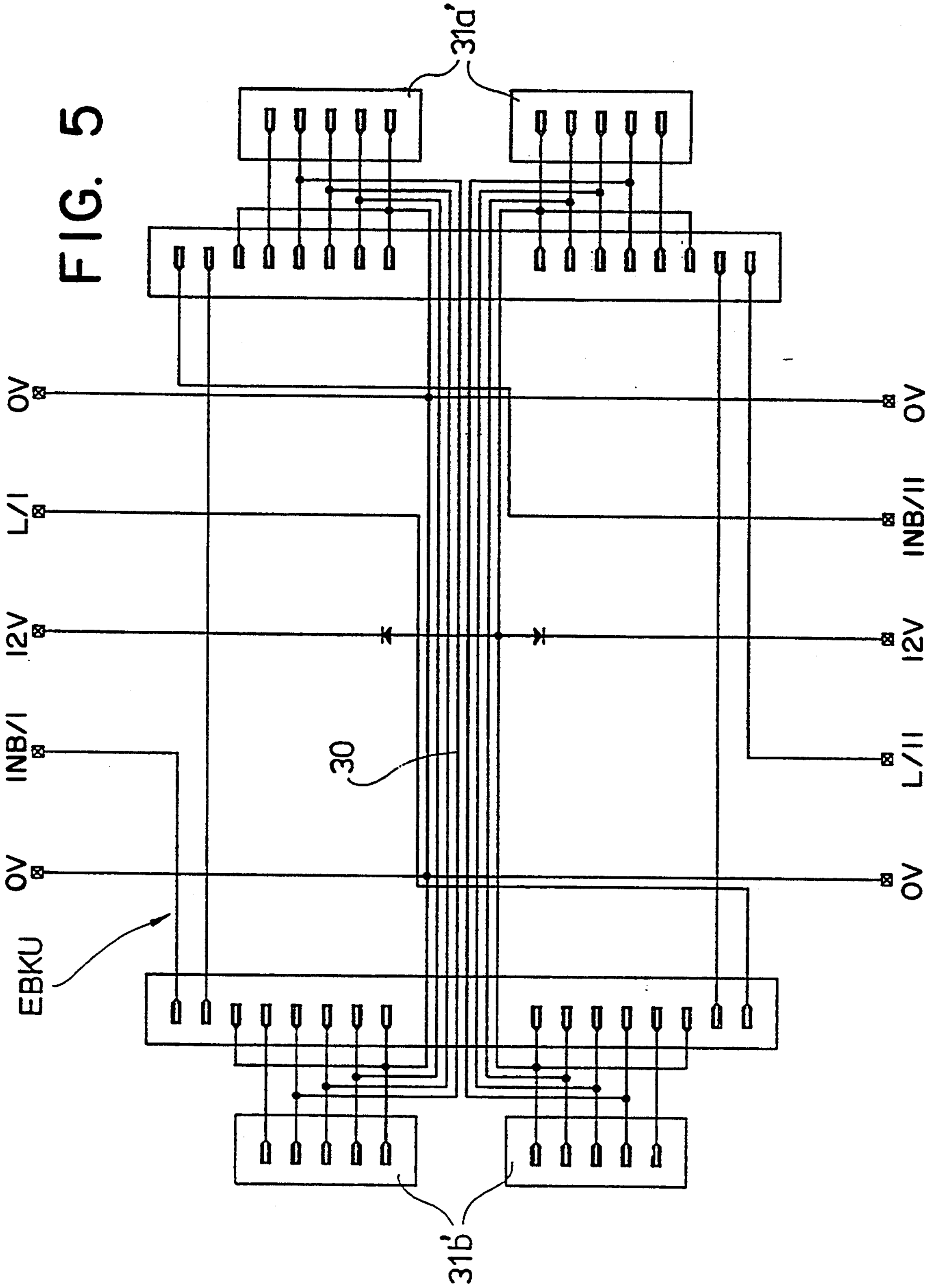
FIG. 5 shows a further wiring form, of FIGS. 3 and 4, with connections on both sides in the form of plugs or sockets.

The depictions of FIGS. 3, 4 and 5, which belong together, again show this basic concept of the present invention in greater detail: still using the block diagram depiction, FIG. 3 illustrates the left, terminating power supply unit EBKS as a subhousing of the basic device, for example with a socket strip 31*a* arranged on the right side of the housing, while control unit EBKC of FIG. 4, also belonging to the basic device, correspondingly has a plug strip 31*b* on the left side. The depiction in FIG. 4 also clearly shows the various tie lines 30 that are guided continuously to the outer contact terminals; the one additional supplementary monitoring unit EBKU shown in FIG. 5 indeed clearly indicates that tie lines 30 actually do run continuously from the left to the right plug contact terminal, and the respective internal circuit elements of each unit constitute taps on the continuous lines and are thus in a position ultimately to be switched through to the processor and output interface circuits of the power supply unit EBKS, where they can be processed. Accordingly, then, the EBKU supplementary monitoring unit of FIG. 5, still continuing the prior convention, has on the left side of the illustration a plug strip 31*b*' and on the right side a socket strip 31*a*'. It is evident that FIGS. 3, 4 and 5 schematically show the only the tie line regions that are relevant here, and that individual circuits are not depicted. The depiction in FIG. 4 also shows that the terminal circuit of control unit EBKC is always required, in each case on the right side (according to convention) so that no open sockets are present at that point. Only by connecting control unit EBKC, which returns and correctly terminates tie lines 30, is it in any way possible to operate the entire monitoring system, with expansions if applicable.

Figure 6A:
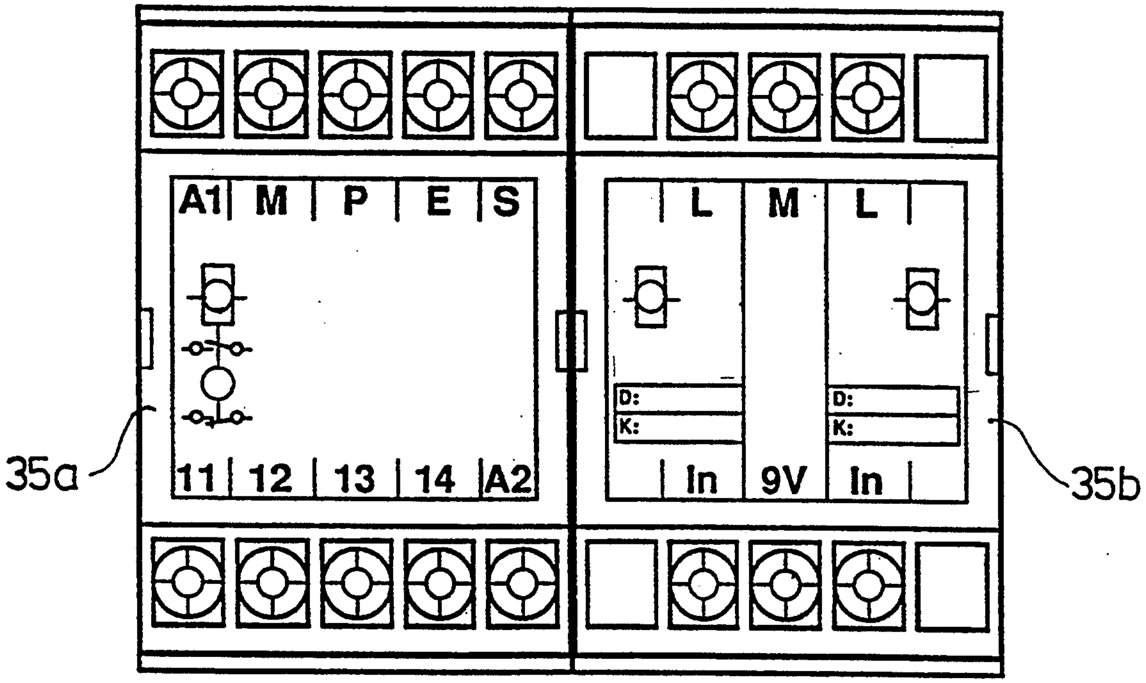
FIGS. 6A and 6B show top, front and rear views of the external housing of the basic device of the present invention.
Figure 6B:
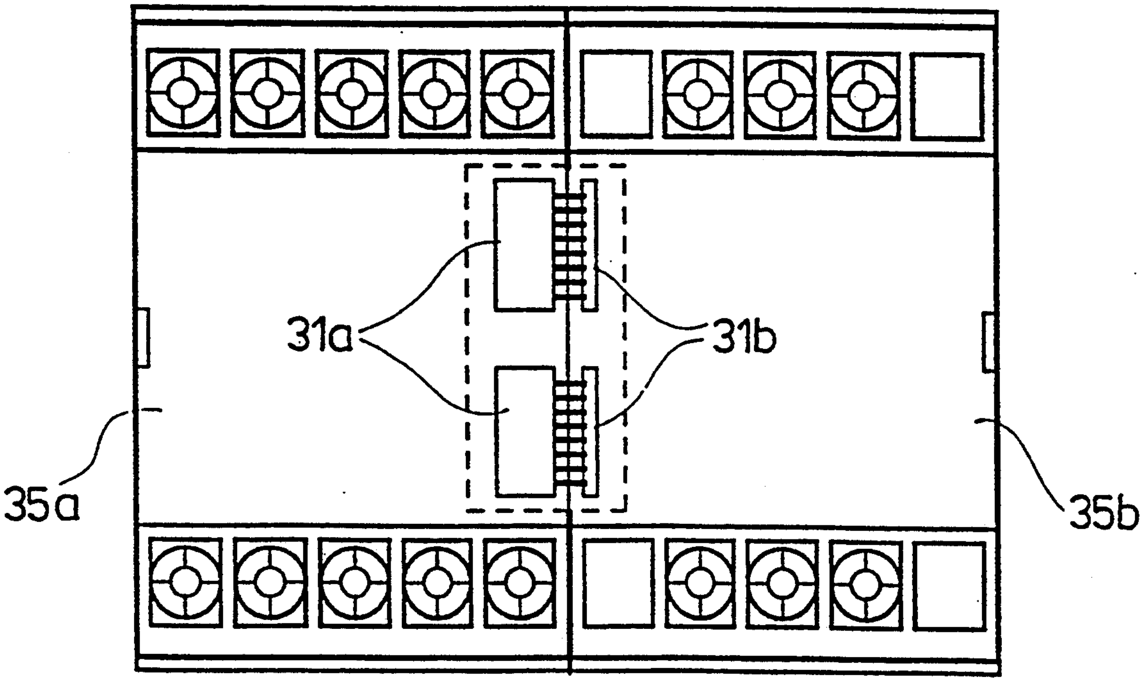
Figure 7A:
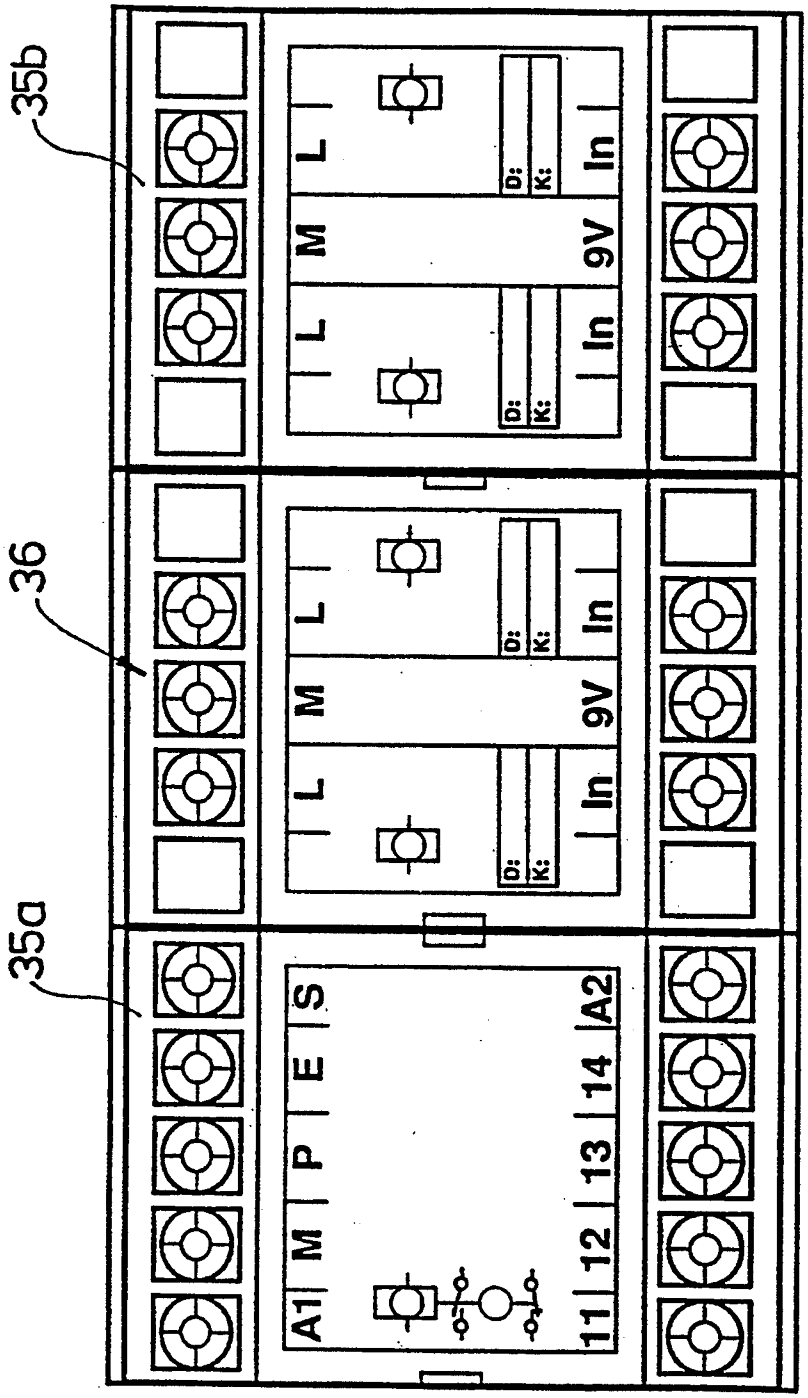
FIGS. 7A and 7B show top, side and rear views of the external housing of the basic device with a supplementary monitoring unit of the present invention.
Figure 7B:
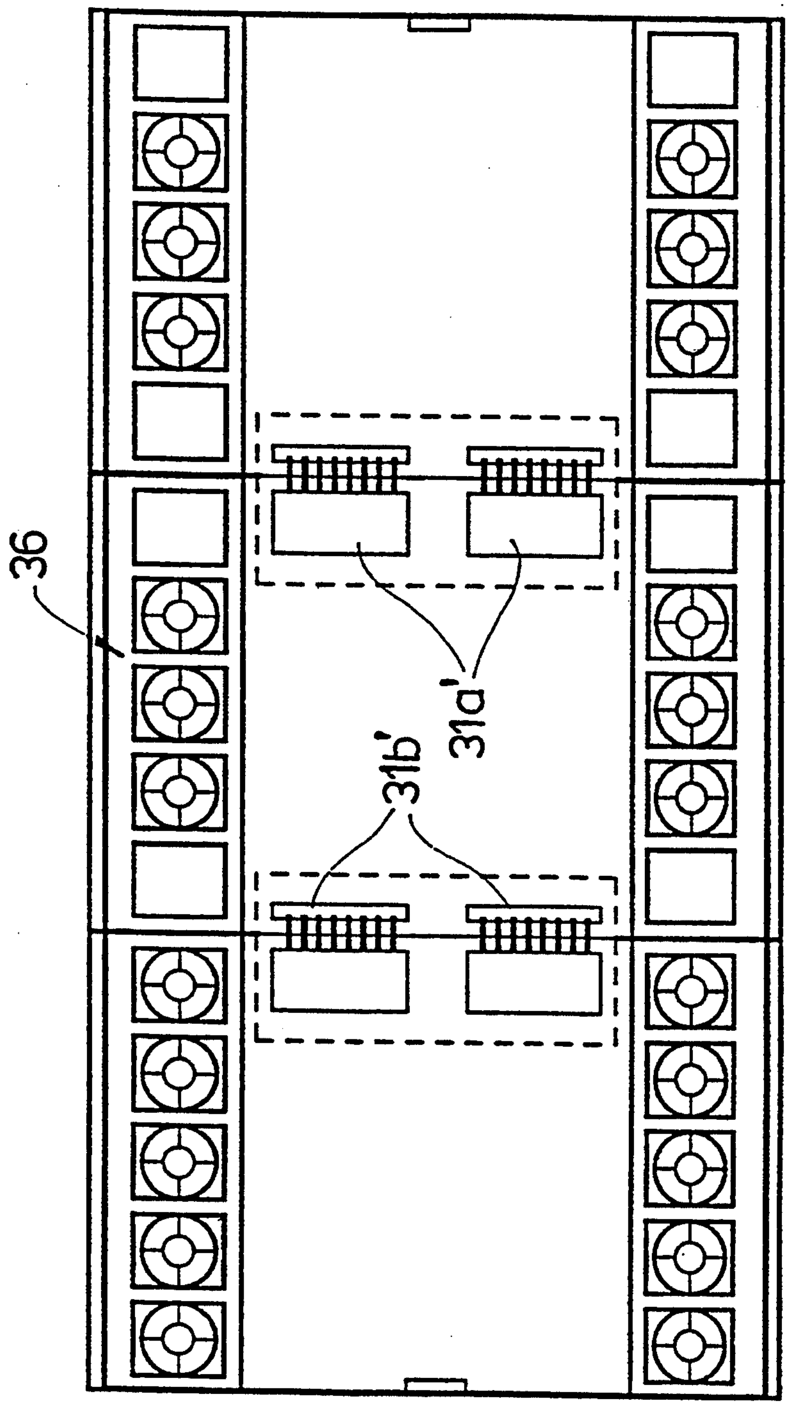

FIGS. 6 and 7 show practical embodiments of external housing aspects and possibilities for connecting them together in series; FIG. 6 (top) shows, in top view, the connection side of the basic device with the two subhousings 35*a* for the power supply unit and 35*b* for the terminating control unit. FIG. 6 (bottom) shows the back side or plug contact side of the two subhousing, continuously connected to one another in series; socket strip 31*a* of the EBKS subhousing 35*a* for the power supply unit, and pin side 31*b* of the control unit connected thereto are evident. FIG. 7 shows how the subhousings are connected in series when the arrangement is expanded by one EBKU monitoring unit; FIG. 7 (top) again shows a top view of the connector side, while FIG. 7 (bottom) depicts the continuous series connection with the respectively associated socket and pin contacts. The additional subhousing of supplementary unit EBKU is denoted 36. Mechanical series connection or interposition of one supplementary monitoring unit will in each case expand the creep and rotation monitoring system by two additional shaft circuits, as already explained above.

The invention allows electronic creep and rotation monitoring in protective arrangements for moving and operating the working machine with normal or enhanced safety, with the monitoring system having three different functional modes which can be implemented by means of the corresponding operating mode of the target system, and in this respect can also be externally selected on the device by appropriate action on the monitoring circuit by operating personnel, i.e., whenever corresponding persons are in the target system's hazard region when the said system is in operation.

Stationary monitoring function (special mode without motion)

When a safety hood or safety screen is open on the machine being monitored, the safety circuit is switched to the stationary monitoring function by a corresponding energization signal from the monitoring circuit (default-open door contacts 24*a*, 24*b*). If the slightest motion of the shafts being monitored occurs or if an activation or operating signal is absent, this causes an immediate shutoff of drive energy by the shutoff contactors until the fault is remedied.

Stationary monitoring function (special mode with motion)

When the permission button (default-open switch 25 in the monitoring circuit) is actuated, a corresponding energization signal switches the safety circuit to the stationary monitoring function with creep (limited rotation) permitted. This special function is possible only with the safety hood or safety screen open. In this case, motion of the shaft being monitored is thereby fixed at a limited value, and if this limit value is exceeded or if an activation or operating signal is absent, drive energy is once again immediately shut off until the fault is remedied.

Rotation monitoring function (normal mode)

When the safety hood or safety screen is closed, a suitable energization signal from monitoring circuit 23 switches safety circuit 16 to the rotation monitoring function. Any motion of the shaft being monitored is thereby set at a maximum value and, if this maximum rotation is exceeded or if an activation or operating signal is absent, causes an immediate shutoff of drive energy, again until the fault is remedied. In this connection the parameters for limited creep corresponding to the creep monitoring mode, and those for rotation corresponding to the rotation monitoring mode, can be appropriately modified on installation or even during maintenance.

One embodiment of the invention consists in the fact that even when the individual modes are defined by the operating status of the target system (safety hood open; safety hood open with permission contact pressed; safety hood closed), the necessary signals are processed by the two monitoring measurement systems, each operating independently of one another. Whenever the signal at terminals S' (or E') of monitoring interface 22 is changed by the operating state of the target system, a test mode is activated, in which the two measurement systems are timed against one another and their operability is checked. In the event of a malfunction (incorrect energization or defective monitoring system), if this test mode is activated by only one of the monitoring measurement systems, the safety circuit will then respond to the malfunction by immediately shutting off drive energy.

Figure 9A:
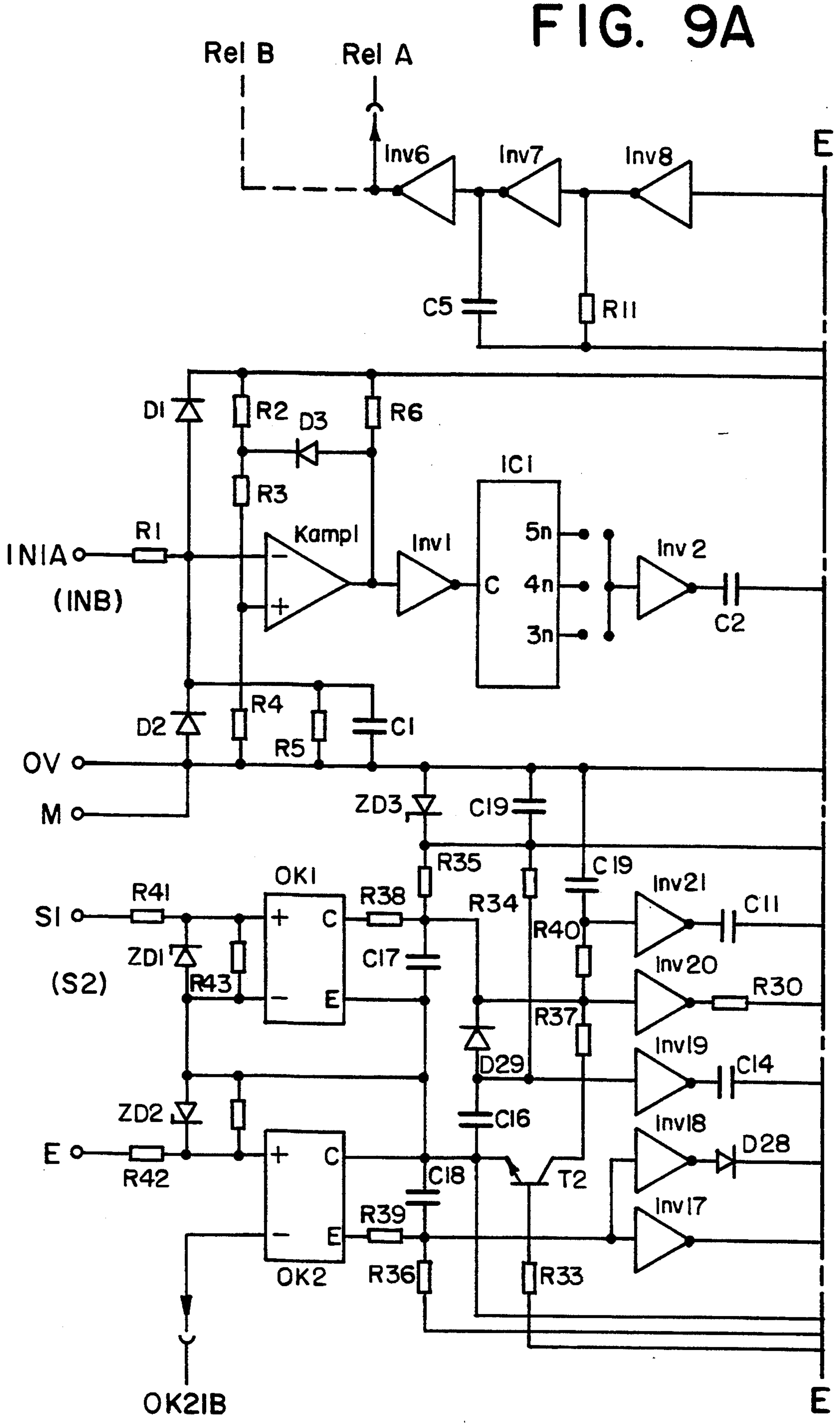
FIGS. 9A, 9B and 9C in greater detail an embodiment of a monitoring measurement system according to the present invention.
Figure 9B:
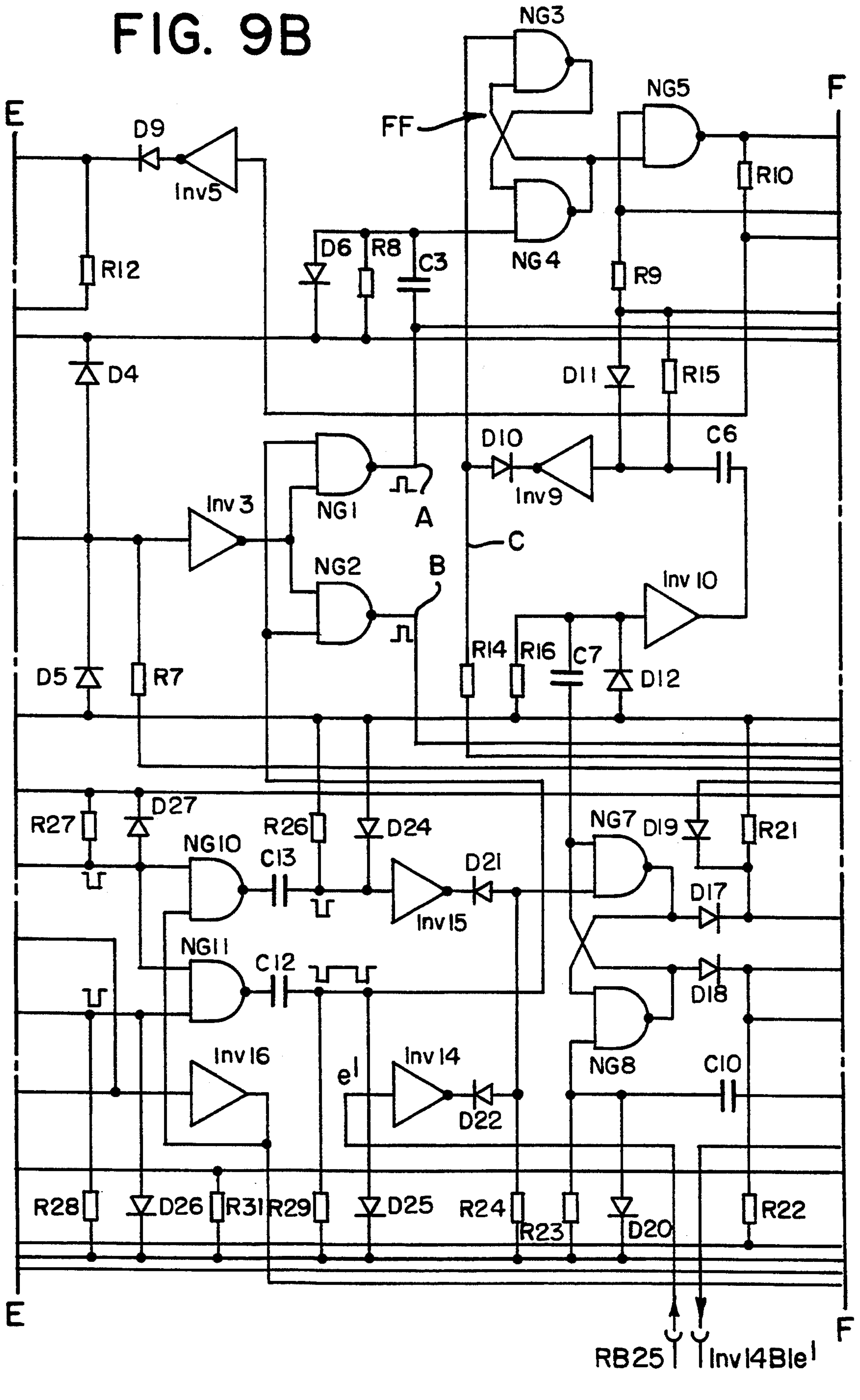
Figure 9C:
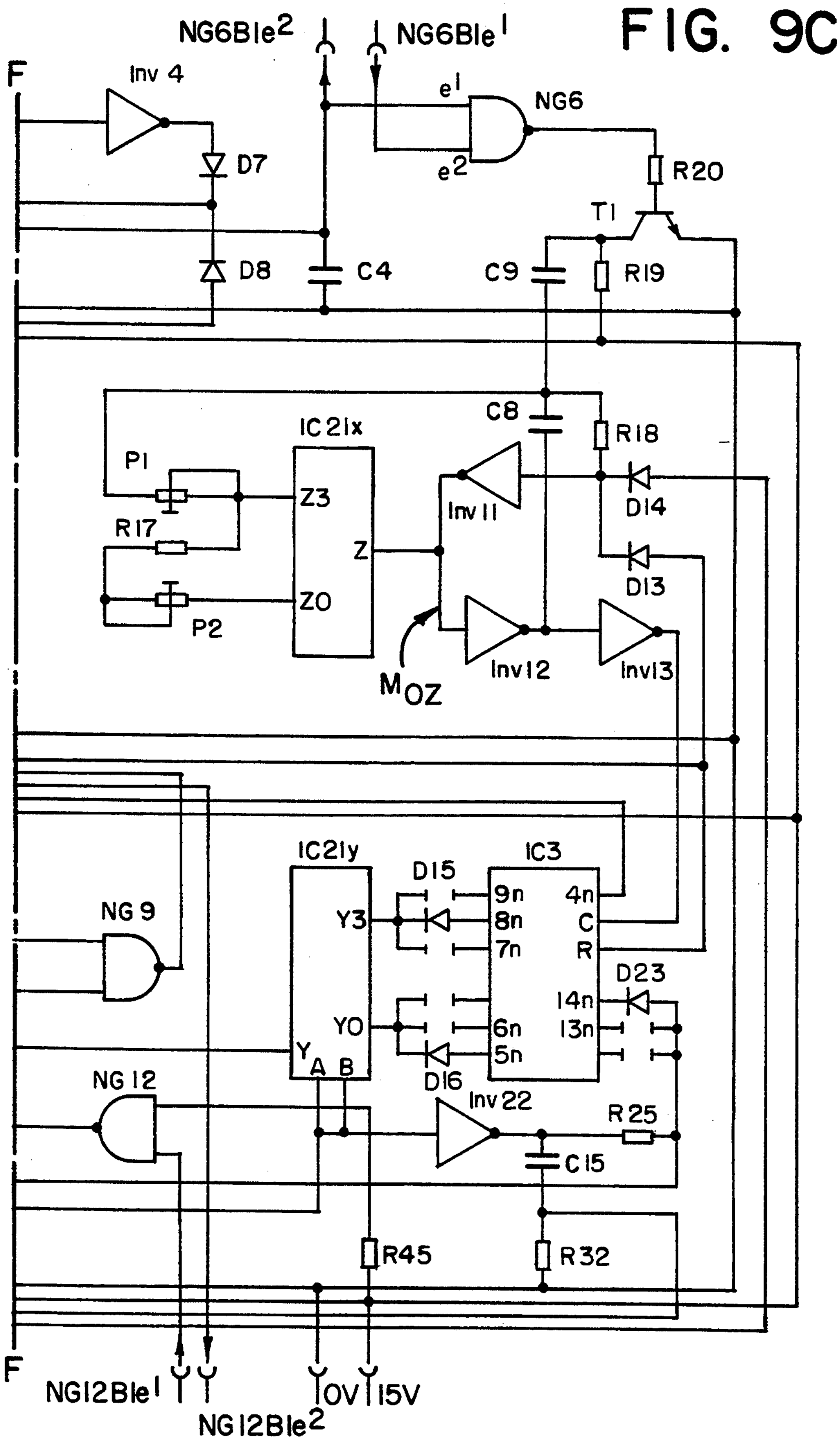

Again referring to FIGS. 8 and 9, a description will now be given of the internal structure and operation of one of the monitoring measurement systems, of which two are provided for each shaft circuit. It shall be understood that this explanation indicates only a specific practical example and that the invention is by no means restricted thereto; in particular, it is also possible to implement this circuit or portions of this circuit in combination with computers or microprocessors, and then possibly as a part of a program.

For better comprehension a few of the more commonly occurring abbreviations and reference numbers will be given. Output driver stages TRA and TRB according to FIG. 8 act on output relays RelA and RelB, which then in turn, by means of their contacts, switch the actual shutoff contactors KA and KB, connected in series in the power feed to power section 13 of target system 10, as is also evident from the illustration in FIG. 1. The following abbreviations and numbers are used:

IN: Encoder signal
13/14: Energization of drive contactor KA
23/24: Energization of drive contactor KB
S/S,: Safety hood/door circuit
E/E': Permission circuit
A1/A2: Operating voltage
Encoder input signals Comparator Kompl adjusts the signal (FIG. 9) present at device input INA of the rotation sensor from the TTL level to the internal voltage level. with suitable component dimensioning a frequency range of up to 200 KHz can be achieved.

The output signal of the comparator is then delivered via inverter Inv1 (all the inverters used in the circuit have inputs with Schmitt trigger characteristics) to divider IC1. The division ratio can be adapted to various frequency ranges of the rotation sensor by inserting an appropriate jumper (3*n*, 4*n*, 5*n*).

Inverters Inv2 and Inv3, capacitor C2, and resistor R7 form the frequency-divided signal provided by the divider so that a positive pulse of about 10 microseconds is always created at the trailing edge at the outputs of NAND gates NG1 and NG2. The output signal of NAND gate NG2 is used as the trigger signal "B" for a measurement oscillator Moz via diode D13, and the signal from NAND gate NG1 as the trigger signal "A" for flip-flop FF from NAND gate NG3 and NAND gate NG4. Similarly, reference trigger signal "C" of measurement oscillator Moz is made available via resistor R14 to a flip-flop FF.

If, as described below, reference trigger signal "C" is no longer being made available via resistor R14, flip-flop FF is then only being energized by trigger signal "A". The output signal of NAND gate NG4 and triggering by means of diode D8 results in a change of output at NAND gate NG5. This [signal] is stored by means of inverter Inv4 and diode D7 so that the status always remains the same. This storage can only be erased by another reference trigger pulse "C". The change in output at NAND gate NG5 activates, via resistor R10 and NAND gate NG6, the hysteresis of the measurement oscillators of both monitoring systems (as mentioned, the circuit of FIG. 4 is present in duplicate), and thus produces the following effects:

The frequencies of both measurement oscillators are decreased by about 10%. This allows monitoring system "B" (again as described earlier) to change its output state.

The output signal is then delivered through resistor RIO to inverter Inv5 and diode D9 to a driver generator TG. Driver generator TG, which consists of inverters Inv6, Inv7 and Inv8 as well as capacitor C5 and resistors R11 and R12, is thereby stopped. The energy supply of output relays RelA and RelB is interrupted by means of a dynamic energization system (see FIG. 3) consisting of resistors R50 and R51, transistor T3, transformer Uel, Zener diodes ZD5 and ZD6 and diodes D40, D41 and D42, and terminating capacitor C20. To prevent the output relay from falling back into its neutral position during this process, the relay coil voltage is stored for about 25 ms by capacitor C20, as already mentioned. However, the unenergized state is reported via an optical coupler OK3 to gate NG12, and, if the monitoring system is in the same state in measurement system area B, can acknowledge the test ramp by means of the output of NAND gate NG12 via NAND gate NG8. The acknowledgment process generates, by means of inverters Inv9 and Inv10, resistors R15 and R16, diode D10 and capacitors C6 and C7, a pulse that erases the information stored by NAND gate NG5 and inverter Inv4. As a result, energy is once again delivered via the driver generator to the dynamic energization system of output relay Rel. In addition, the actual measurement frequency (reference trigger signal "C") of integrated circuit IC3—output 4*n*—can then become effective at the flip-flop via diode D19, NAND gate NG9 and resistor R14. If reference trigger signal "C" via resistor R14 again disappears, the driver generator will in turn be stopped as before. Energy delivery for output relay Rel will again be interrupted. This state is maintained as long as supply voltage is applied to the monitoring system.

Structure and operation of the measurement oscillator

Measurement oscillator Moz (already referred to) is made up of inverters Inv11, Inv12 and Inv13 together with an electronic switch IC2/z (terminals Z3/Z thereof) and capacitor C8, resistor R18 and potentiometer P1. The components capacitor C9, resistors R19 and R20 and transistor T1 exert a slight influence on the frequency of the measurement oscillator (hysteresis). In addition, the measurement frequency of the oscillator can be changed by means of regulator P2 and resistor R17 via permission button 25 at device input E1 and optical coupler OK2 (see FIG. 8) and inverter Inv17 of electronic switch IC2/y (terminals A/B thereof—see FIG. 4; also acts on IC2/z). Furthermore, the measurement oscillator can be stopped by means of the monitoring signal at device input S1, via optical coupler OK2, inverters Inv18 and Inv16, and diode D14. As a result of these features, the oscillator has three different measurement frequencies:

a) Measurement frequency for rotation monitoring (normal mode)
b) Measurement frequency for creep monitoring (special mode with motion)
c) Measurement frequency for creep monitoring (special mode without motion)

The output signal of the measurement oscillator at inverter Inv13 is delivered to terminal C of divider IC3. Divider IC3 in turn generates a variety of measurement frequencies that are defined by inserting appropriate diodes D15, D16 and D23. Depending on the effect of the permission button at device input E1, electronic switch IC2/y selects, by means of output terminal Y, a suitable test ramp frequency from the two measurement frequencies made available by IC3 at terminals YO/Y3. The actual measurement frequency of circuit IC3 (terminal 4*n*), along with the test ramp frequency, is delivered to NAND gate NG9 and is thus available at the output of NAND gate NG9 and via resistor R14 to flipflop FF as a reference trigger signal "C" for triggering. The corresponding frequency is defined by the output of NAND gate NG9 via NAND gates NG7 and NG8, and diodes D17 and D18. This is done automatically by circuit IC3, diode D23 and inverter 22 from the monitoring system of circuit area B; by inverter 14 and diode D22 from the monitoring system of circuit area A; or manually by means of inverter 15 and diode D21.

Measurement oscillator moz and the divider are always restarted by trigger pulse "B" via diode D13 and terminal R of circuit IC3. If the duration of the trigger pulse is less than the measurement frequency applied to circuit IC3, terminal C, it follows that no reference trigger signal "C" for flip-flop FF can be provided at the output of NAND gate NG9.

Input signals of the monitoring circuit

When a signal is present at device input S1, optical coupler OK1 (FIG. 4, bottom left) generates, via inverters Inv19 and Inv21, diode D29, capacitor C16 and resistor R40, two pulses 100 ms apart. In addition, the device input information is sent via inverter Inv20 to the measurement oscillator and divider. The latter are stopped by this process, to prevent a reference trigger signal "C" from being generated at the gate output of NAND gate NG9. The generated pulses are sent, as trigger signal "A", to the flip-flop via capacitors C11 and C12, NAND gate NG11, capacitor C12 and NAND gate NG1. Since no reference trigger signal "C" is available through resistor R14, the flip-flop is now energized only by trigger signal "A". The output state of NAND gate NG4 and the triggering by diode D8 results in a change of output at NAND gate NG5. To ensure that this state is maintained, it is stored by inverter Inv4 and diode D7. In addition, this output state is delivered via resistor R10 to inverter Inv4 and diode D9, and thence to the driver generator, which is also stopped as a result. The dynamic energization interrupts the energy supply of output relay Rel. The unenergized state is reported via optical coupler OK3 to NAND gate NG12 and can, if the monitoring system in area B has the same state, acknowledge the test ramp at NAND gate NG8 via the output of NAND gate NG12. The acknowledgment process generates a pulse, as already mentioned, that erases the information stored by NAND gate NG5 and inverter Inv4. As a result, energy is again delivered through driver generator TG to the dynamic activation section for output relay Rel. If a trigger signal "A" again occurs, the driver generator is turn stopped, as before. Energy delivery for output relay Rel is again interrupted. This state is maintained as long as supply voltage is applied to the monitoring system. Because of the output relay release delay, the pulses must be generated by device inputs S1 and S2 within 20 ms. To ensure that the process just described can occur even when changes occur in the signal at device input E1, pulse generation is restarted by inverter Inv22, capacitor C15, resistor R33 and transistor T2.

When a signal is present at device input E1, a pulse is generated at inverter Inv15 by means of inverter Inv18, diode D18, inverter Inv16, NAND gate NG10 and capacitor C13. This pulse sets the test ramp via NAND gate NG7 and diode D17 at NAND gate NG9.

The test ramp is automatically set only in rotation monitoring mode. If a signal is available, from circuit IC3 via diode D23, from the section B monitoring system, the test ramp is then set by inverter Inv14 and diode D22. This signal can result only if the pause times of trigger signal "C" are $>150$ ms. Operating voltage is supplied to the stationary and rotation monitoring circuit via terminals A1 and A2. After bridge rectifier BN1, voltage is made available to the dynamic energization sections of output relays RelA and RelB. Similarly, stabilized voltage for the electronics of monitoring sections A and B is delivered through fixed voltage regulator ICN1 (FIG. 3). Lastly it should be mentioned that the operation of the monitoring measurement system associated with this shaft circuit differs from that of the one described only in that frequency dividing at the input can be omitted if the second rotation signal occurs as signal L.

All of the features presented in the specification, the claims and the drawings, both individually in themselves and in any combination with one another, can be essential to the invention. In particular, the main claim is a provisional attempt at wording without a knowledge of the prior art, which will not be determined until an official search is made. The applicant also reserves the right to make reductions in features in the main claim.

What is claimed is:

1. An apparatus for safety monitoring of rotating machinery, said machinery having a protective device to prevent contact therewith, first and second shaft circuits for monitoring rotation of shafts of said machinery, shut-off contactors in a power supply section thereof, a protective device monitoring circuit for indicating the operation of said protective device, and a manually-activated monitoring circuit for controlling slow rotation of said machinery, said safety monitoring apparatus comprising:

a power supply unit, said power supply unit responsive to said protective device and manually activated monitoring circuits for controlling power to said shut-off contactors of said machinery;

a terminating control unit, said terminating control unit responsive to said first shaft circuit of said machinery for generating a first control signal indicating the rotational condition of said machinery;

at least one supplemental control unit, said supplementary control unit responsive to said second shaft circuit of said machinery for generating a second control signal indicating a rotational condition of said machinery;

a power supply unit subhousing;

a terminating control unit subhousing;

and at least one supplemental control unit subhousing;

each of said subhousings having plug contact means for providing electrical and mechanical connections;

and lead means for connecting said power supply unit subhousing, said at least one supplemental control unit subhousing and said terminating control unit subhousing in series.

2. An apparatus according to claim 1, wherein said plug contact means on said power supply unit subhousing and said terminating control unit subhousing are different.

3. An apparatus according to claim 2, wherein said plug contact means are directional terminals, being either male or female.

4. An apparatus according to claim 1, wherein said power supply unit subhousing, said at least one supplemental control unit subhousing and said terminating control unit subhousing have external terminal connections for connection with external rotation sensors, power terminals, or contactor energization systems.

5. An apparatus according to claim 1, wherein said plug contact means have internal tie lines, said internal tie lines being connected to said external terminal connections, said terminal control unit and said at least one supplemental control unit being connected in parallel by said tie lines.

6. An apparatus according to claim 1, further comprising:

a first means for prohibiting operation of said machinery if said first monitoring circuit indicates a hazardous condition;

a second means for allowing limited operation of said machinery, upon actuation of said manually-actuated monitoring circuit; and a third means for allowing full operation of said machinery if said first monitoring circuit indicates a safe condition.

7. An apparatus according to claim 6, further comprising:

a rotation signal from a motion sensor in said machinery, said rotation signal being supplied to said first, second and third means; and an energization signal from a motor of said machinery, said energization signal being supplied to said first, second and third means.

8. An apparatus according to claim 1, wherein said plug contact means of each of said subhousings prevents incorrect series connecting of said subhousings.

9. An apparatus according to claim 1, wherein said power supply unit provides power to said terminating control unit and said at least one supplemental control unit;

said power supply unit provides monitoring signals from said first monitoring circuit and said manually-actuated monitoring circuit to said terminating control unit and said at least one supplemental control unit; and said power supply unit provides shut-off signals to said shut-off contactors 1in said power supply section of said machinery.

* * * * *